July 22, 1969 G. P. HOUCKE 3,457,368

CODE CHARACTER KEYBOARD SENDER

Filed Nov. 15, 1965 3 Sheets-Sheet 1

INVENTOR
G. P. HOUCKE
BY R C Lipton
ATTORNEY

July 22, 1969 G. P. HOUCKE 3,457,368

CODE CHARACTER KEYBOARD SENDER

Filed Nov. 15, 1965 3 Sheets-Sheet 2

July 22, 1969 G. P. HOUCKE 3,457,368

CODE CHARACTER KEYBOARD SENDER

Filed Nov. 15, 1965 3 Sheets-Sheet 3

United States Patent Office 3,457,368
Patented July 22, 1969

3,457,368
CODE CHARACTER KEYBOARD SENDER

George P. Houcke, Tenafly, N.J., assignor to Bell Telephone Laboratories, Incorporated, New York, N.Y., a corporation of New York Filed Nov. 15, 1965, Ser. No. 507,935
Int. Cl. H04l 15/16; H01h 1/66
U.S. Cl. 178—17 36 Claims

ABSTRACT OF THE DISCLOSURE

In a keyboard operated signal sender, the operation of a single key activates a magnetic latching arrangement which disables the rest of the keyboard during the subsequent transmission of a binary code word. Key latching is provided by a controllable magnetic flux circuit which extends through the manual key in such manner that movement of the key is inhibited.

This invention relates to a keyboard operated signal sender and, more particularly, to data and teletypewriter transmitters which involve the cooperation of mechanically operated keyboards and electronic data signal senders.

A broad object of this invention is to provide an improved keyboard transmitter for sending data signals.

Although the use of automatic machine senders is rapidly increasing, keyboard transmitting from manual operator postions is still widespread. These keyboard senders may be utilized to originate messages to printers at other operator positions and to the automatic machines. The printers and automatic machines are generally arranged to receive any one or more of several data codes now conventionally employed. In addition, each data code may be transmitted at several different signaling speeds. Accordingly, the keyboard sender advantageously is capable of sending different data codes at different speeds.

In preferred keyboard senders, the depression of a key functions to close a pair of contacts individual to a data character. In response thereto, an encoder inserts the signal elements of the data character into a register and a sender circuit transmits the inserted character signal elements.

The keyboard includes a latching arrangement which precludes the operation of subsequent keys while the operated key remains depressed. The release of the latch is then delayed for a character duration interval so that the operator will not insert a new character into the register prior to completion of the character transmission. In addition, since the operator can determine the completion of character transmission by the unlaching of the next key, she can adjust her typing speed to conform with the code signaling speed. The latches, however, are generally complex mechanical arrangements which are cumbersome and slow acting. In addition, the latching interval cannot readily be fixed to conform exactly with the character intervals. Moreover, the delay cannot be varied for different codes and signaling speeds.

Where electronic encoders, senders and registers are utilized, character intervals can be determined by the character cycling of the sender circuit. One method of precluding premature character insertion in the register in such circuits is to disable the encoder or input to the register while the sender is cycling. The sender, in this case, is generally limited to one specific code and signaling speed.

The electronic circuits are, of course, capable of high speed operation. Since they are cooperating with a manual operation of mechanical elements other problems arise such as insertion or loss of elements due to key contact chattering and repetition of characters resulting from prolonged depression of keys.

Accordingly, it is an object of this invention to provide a fast acting latching arrangement which does not require complex mechanical components.

It is another object of this invention to provide key latching which indicates proper typing speed.

It is another object of this invention to vary the delay of the latch release to conform with the duration required to transmit the specific code character at the signaling speed of the sender.

It is a further object of this invention to preclude signal garbling due to premature element insertion in registers for multi-code and multi-speed senders.

It is an additional object of this invention to eliminate the effects of key contact chattering.

It is another object of this invention to prevent the repetition of the transmission of a character when a key is maintained depressed.

It is a feature of this invention that latching is provided by a magnetic flux source. This source is preferably a permanent magnet connected to each key and transportable by the key to a position adjacent to flux conductive latching members when the key is released whereby key movement is restrained.

In accordance with another feature of this invention, the flux from the magnet closes the key contacts when the key is operated. The key contacts may comprise magnetic reeds position to provide a flux path for the magnet when the key is depressed.

In accordance with a further feature of this invention, the key latching is overcome by a second magnetic flux source which opposes the flux applied through the latching members by the permanent magnet. The second source may comprise an externally energized coil wound on a metallic core.

It is a further feature of this invention that each of the second sources is deenergized when a character is being transmitted in response to a key contact closure to render the latching means effective and restrain the unoperated keys.

In accordance with a further feature of this invention, the presence of elements in the register is detected to enable key latching during character transmission by deenergizing the second magnetic flux source until the sender circuit removes all the signal elements from the register.

In accordance with another feature of this invention, an extra element, in addition to the character elements, is inserted into the register. This element remains in the register during character transmission to insure that the detector is enabled until character transmission is completed for any code or signaling speed.

In accordance with an additional feature of this invention, encoding action is provided by magnetic cores selected by leads completed through key contacts and energized by a core driver circuit. The driver circuit action is initiated by the key contact closure and operates after a delay to permit chatter to subside. Since the driver only recognizes the initial closure operation, prolonged key depression does not reoperate the driver and character repetition is avoided.

It is a further feature of the invention that the detector provides a bias to disable the core driver to preclude encoding action while a character is being transmitted.

The foregoing and other objects and features of this invention will be fully understood from the following description of an illustrative embodiment thereof taken in conjunction with the accompanying drawing wherein.

Figure 1:
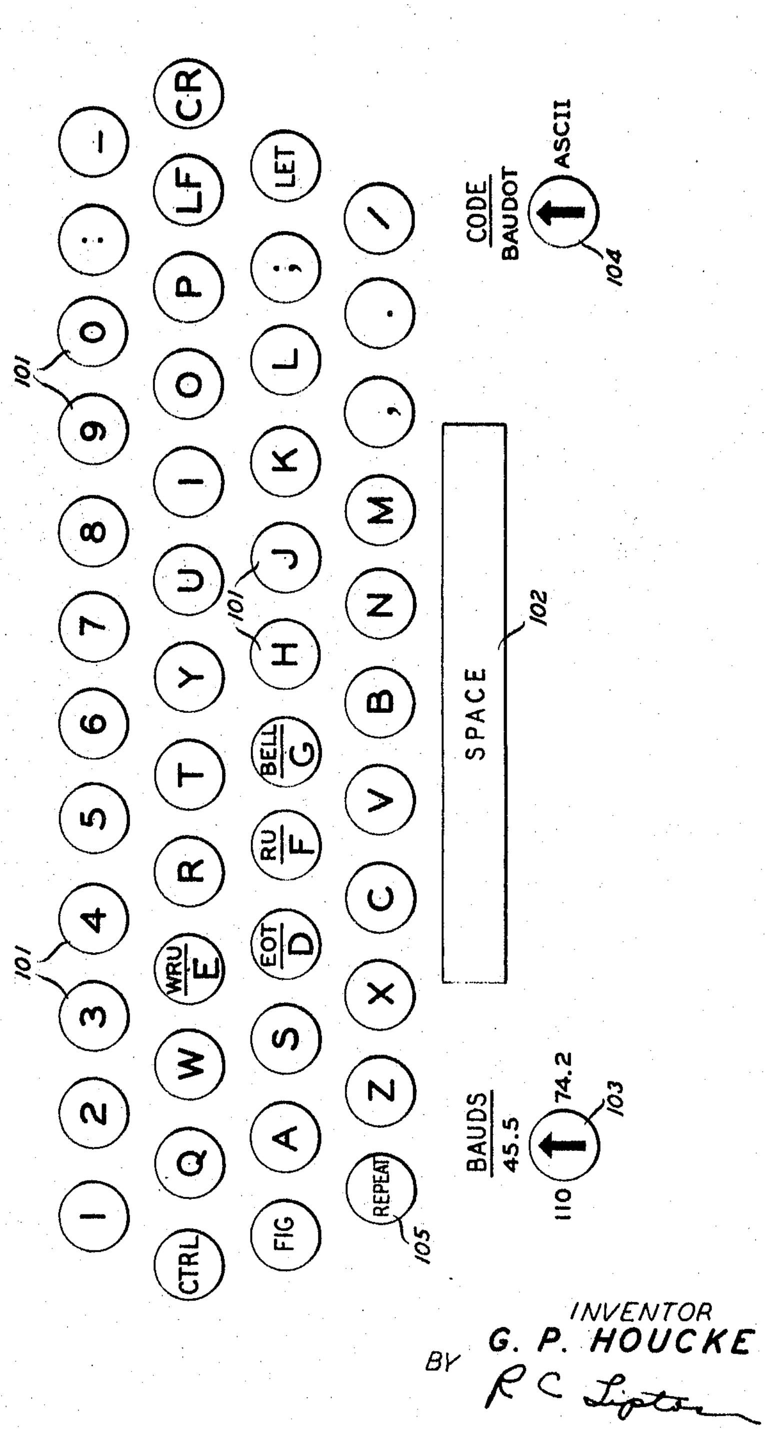
FIG. 1 shows a top view of a keyboard arranged in accordance with this invention.

The representation of the top of the keyboard as shown in FIG. 1 includes a plurality of key tops such as key top 101, a space bar 102, a bauds key 103, a code key 104, and repeat key 105. Each of keys 101 are provided with a structure as described hereinafter and function to transmit a predetermined one of the conventional teletypewriter and data characters as indicated on their face. Space bar 102 is similarly structured and functions to transmit the "space" character.

In order to provide transmission of the appropriate code, code key 104 is arranged to be rotated upward as shown in FIG. 1 to the Baudot position whereby, as described hereinafter, the sender circuit transmits teletypewriter Baudot characters. To transmit ASCII characters, as described hereinafter, code key 104 is rotated to the right, as shown in FIG. 1, to the ASCII position.

The keyboard sender is arranged to transmit in one of several speeds. This is provided by bauds key 103 which, when rotated to the left, as viewed in FIG. 1, to the 110 bauds position arranges the keyboard sender to transmit ASCII code at 100 words per minute, as described hereinafter. To transmit Baudot at 60 words or 100 words per minute, key 103 is rotated upward to the 45.5 position or rotated to the right, as viewed in FIG. 1, to the 74.2 position, respectively.

Repeat key 105 is utilized for a repeated transmission of a character. This function will be described hereinafter.

Figure 2A:
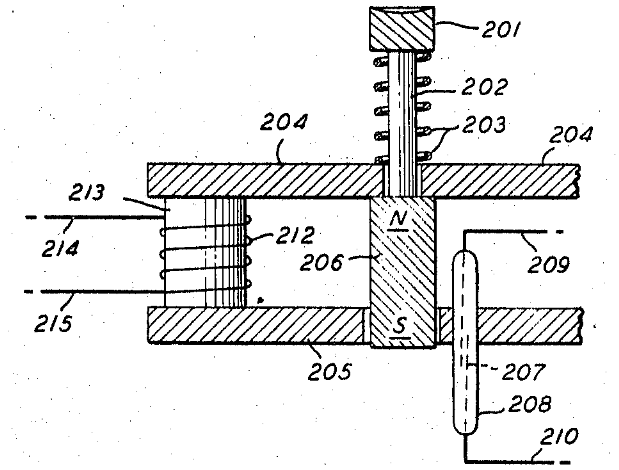
FIGS. 2A and 2B show side views of a mechanical key in the released and depressed positions, respectively, together with the key contacts and key latching arrangement.
Figure 2B:
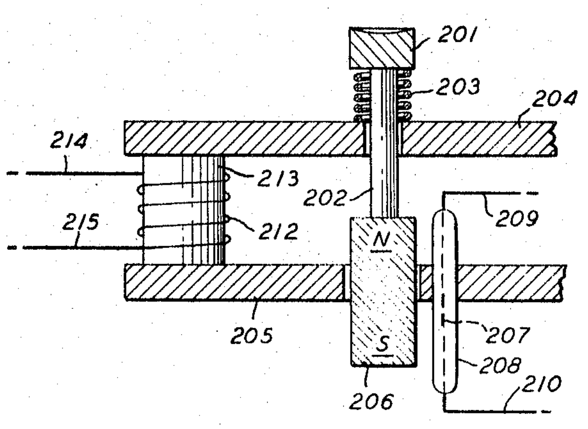

Key top 201, as shown in FIGS. 2A and 2B, is typical of the several key tops previously described with reference to FIG. 1. Connected to key top 201 and extending therefrom is key stem or rod 202. Key stem 202 extends through an aperture in upper metallic latch plate 204. Connected to key stem 202 below upper plate 204, as shown in FIG. 2A, is magnet 206. The north pole of magnet 206 is adjacent to the connection with key stem 202. Magnet 206 extends through an aperture in lower metallic latch plate 205.

Intermediate key top 201 and upper metallic latch plate 204 and wound around key stem 202 is coil spring 203. In the normal unoperated position, as shown in FIG. 2A, coil spring 203 functions to urge key top 201 upward, whereby magnet 206 abuts the lower edge of upper metallic latch plate 204. In this position, the south pole or lower edge of magnet 206 is adjacent to lower metallic latch plate 205, as shown in FIG. 2A. When the operator depresses key top 201, urging the key downward, as shown in FIG. 2B, magnet 206 is moved away from upper metallic latch plate 204 and positioned where approximately half the magnet is above latch plate 205 and half of the magnet below the plate.

Mounted in lower metallic latch plate 205 is reed switch 208 which switch includes a pair of reed switch contacts 207. Connected to reed switch contacts 207 are output leads 209 and 210. These leads, as described hereinafter, extend to the encoding circuit. The reed switch 208 is approximately half above and half below lower metallic latch plate 205, and thus immediately adjacent to magnet 206 when key top 201 is in the depressed position, as shown in FIG. 2B.

Abutting and intermediate upper metallic latch plate 204 and lower metallic latch plate 205 is steel spacer 213. Coil 212 is wound around steel spacer 213 and the terminals of coil 212 are connected to leads 214 and 215.

Referring to FIG. 2A, when key top 201 is in the normal position forced upward by coil 203, magnet 206 abuts upper metallic latch plate 204, as previously described. Under this condition, a magnetic flux path produced by magnet 206 passes through upper metallic latch plate 204, steel spacer 213, and lower metallic latch plate 205 back to magnet 206. Thus, magnet 206 tends to adhere to upper metallic latch plate 204 and thereby lock the key in the unoperated position. In the event, however, that a current is passed from lead 215 through coil 212 to lead 214, an opposing magnetic field is set up through the upper metallic latch plate 204, magnet 206 and lower metallic latch plate 205. This magnetic flux opposes the flux set up by magnet 206, whereby the key is unlocked and the only force then urging the key top 201 upward is exerted by spring 203.

Assuming now that key top 201 has been operated to its lower position, as shown in FIG. 2B, the main flux path of magnet 206 now passes through reed contacts 207. Accordingly, reed contacts 207 close and lead 209 is connected to and extends to lead 210. Thus, in the operated position of key top 201, reed switch 208 interconnects leads 209 and 210.

Figure 3:
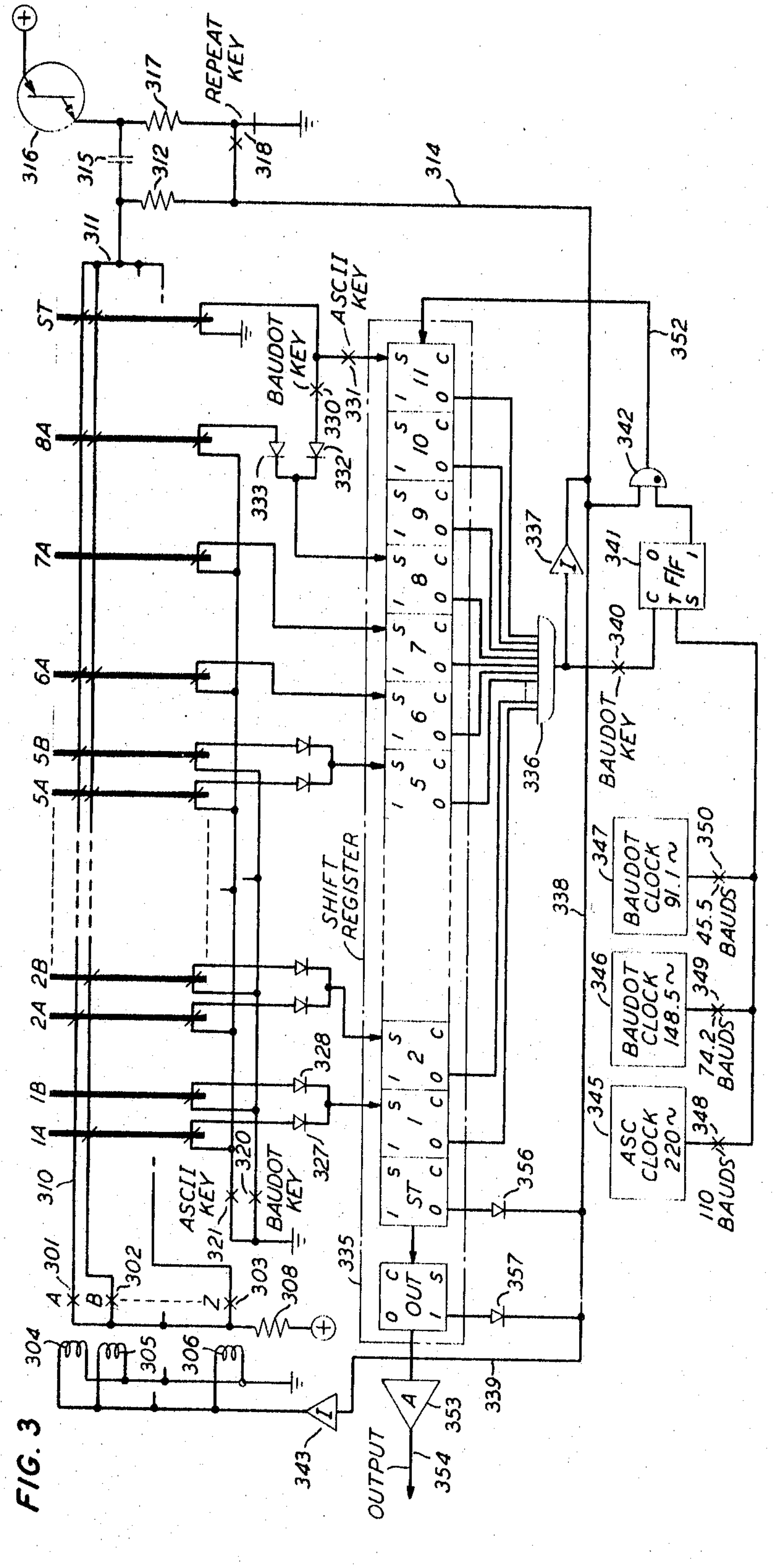
FIG. 3 depicts, in schematic form, an electronic keyboard sender and the manner it cooperates with the key contacts and latch.

In FIG. 3, each of make contacts 301, 302 and 303, designated A, B, and Z, correspond to an individual one of reed switch contacts 207, previously described in FIGS. 2A and 2B. Positive battery is thus applied by way of resistor 308 to each of switch contacts 301 through 303 and other intermediate switch contacts not shown.

Individual to each of the switch contacts 301 through 303 are coils 304 through 306 respectively. Each of coils 304 through 306 correspond to an individual one of the magnetic latching coils 212, previously described with respect to FIGS. 2A and 2B.

The operation of any one of the switch contacts applies the positive battery passed through resistor 308 to single turn input windings on predetermined ones of a plurality of linear, magnetic cores designated ST, 1A through 8A and 1B through 5B; cores 3A to 4A and 3B to 4B are not shown. This common battery then proceeds to a common terminal point 311. Terminal point 311 is connected to the left hand plate of capacitor 315, as viewed in FIG. 3, and by way of resistor 312 to lead 314, which, as described hereinafter, is normally at ground potential. Thus, the left hand plate of capacitor 315 is normally at ground.

The output leads of each of the switch contacts 301 through 303 are interleaved and wound through the magnetic cores in a manner to generate an appropriate teletypewriter code and, in addition, through core ST. In accordance therewith, core ST indicates the operation of any one of switch contacts 301 through 303. Cores 1A through 8A produce the ASCII code, which code, as is well known in the art, comprises a start spacing element, 8 information or variable elements, and 2 stop or marking elements. Magnetic cores 1B through 5B produce the Baudot code, which code comprises a start spacing element, 5 information or variable elements, and a marking stop element having a duration approximately one and a half times the duration of the other elements.

Tracing now the path completed by switch contacts 301, which contacts produce the teletypewriter character A, it is noted that this path is completed to lead 310. Lead 310 is in turn connected to windings on cores 3B and 4B, not shown, and on core 5B to produce the Baudot character having the information elements MMSSS and on cores 2A through 6A and 8A to produce the ASCII character having the information elements MSSSSSMM.

In FIG. 3, the well-known mirror symbol notation is employed to represent the magnetic cores and their windings. This is described in detail in the article entitled "Pulse-Switching Circuits Using Magnetic Cores" by M. Karnaugh, appearing in the Proceedings of the I.R.E., volume 43, May 1955. Thus, considering, for example core 5B, the application of a positive current pulse by way of lead 310 to the winding thereon sufficient to saturate the core, drives the core in a direction which may be described as downward as viewed in FIG. 3, in accordance with the mirror symbol notation. Removal of the current would then permit the core to return or relax back to its original neutral condition. Conversely, a positive pulse from terminal 311 to lead 310 by way of the winding of core 5B sufficient to drive the core to a saturated condition may be described as upward, the core then returning to the original neutral condition at the end of the pulse. Accordingly, as described hereinafter, the operation of switch contacts 301 completes paths to the windings of appropriate ones of cores 1B through 5B in accordance with the space elements of the Baudot character A, to the windings of appropriate ones of the cores 1A to 8A in accordance with the space elements of the ASCII character A, and to the winding of core ST. As described hereinafter, a positive pulse is provided to terminal 311 and passed by way of these windings to lead 310 whereby the above described cores are driven upward.

Each of the cores has a secondary or output winding having a plurality of turns. The output winding of core ST extends on one side to ground and on the other side to Baudot key contacts 330 and ASCII key contacts 331, which contacts are operated when key top 104, FIG. 1, is operated to the Baudot or ASCII position, respectively. Assuming now that key top 104 is operated to the Baudot position, the output winding of core ST then extends by way of key contacts 330 and diode 332 to a shift register, generally indicated by block 335 and more particularly to the set input of stage #8 of shift register 335. With key top 104 operated to the ASCII position, the output winding of core ST then extends by way of key contacts 331 to the set input of stage #11 of shift register 335.

Assuming now that one of switch contacts 301 through 303 is operated, a current pulse is applied via lead 310 and appropriate core windings including core ST to ground on capacitor 315. Assuming this pulse is sufficient to saturate core ST, it is driven downward. In accordance with the mirror symbol notation, a negative voltage output is induced in the output or secondary winding of core ST and then applied by way of the operated one of key contacts 330 or 331. This negative pulse, however, has no effect on the set input of stage #11 of shift register 335 since, as described hereinafter, a positive pulse is required to drive the stage to the "set" condition. In addition, if contacts 330 close, this negative pulse is blocked by diode 332. When a positive pulse is provided to terminal 311 and core ST is driven upward, however, a positive voltage pulse is induced in the output winding thereof and then passed either through contacts 330 and diode 332 to the set input of stage #8 or by way of contacts 331 to the set input of stage #11. Thus, stage #8 is "set" when a Baudot character is being transmitted, and stage #11 is "set" when an ASCII character is being transmitted.

Each of the output windings of magnetic cores 1A through 8A is connected in parallel by way of ASCII key contacts 321 to ground. The other sides of the output windings of cores 1A through 8A are connected to the set inputs of stages #1 through #8, respectively, of shift register 335. In some cases as, for example, the output windings of cores 1A and 8A, the connections to shift register 335 are by way of diodes, such as diode 327 and 333. These diodes are utilized to isolate the output windings from other output windings. It is thus noted that when key top 104 is operated to the ASCII position, ground is applied to the output windings of magnetic cores 1A through 8A by way of contacts 321, whereby when the cores are driven upward, a positive pulse is applied to appropriate ones of shift register stages #1 through #8 to set these stages in accordance with the ASCII code. In a similar manner, the output windings of cores 1B through 5B are connected to ground by way of Baudot key contacts 320. Thus, stages #1 through #5 of shift register 335 are set in accordance with the appropriate Baudot character in response to the operation of a switch contact 301 through 303.

Shift register 335 includes 13 shift register stages identified as stage OUT, stage ST and stages numbered 1 through 11. Each of the stages constitutes a binary flip-flop which may be set or cleared by externally applied pulses or by signals shifted down through prior, higher numbered, stages. When a binary flip-flop is set, indicating the storage of a space condition therein, the clear or zero output thereof is in a negative condition. When the stage is cleared, however, the zero output provides a positive condition. These outputs are applied to the next successive stage upon the application of shift pulses to the register, which shift pulses are applied by way of lead 352. Accordingly, the set or clear condition of stage #11 is passed on to stage #10 when a shift pulse is applied to lead 352. Similarly, the condition of stage 10 is shifted down through stages 9 through 1 and then to stage ST and finally to stage OUT. The output of stage OUT is then passed to amplifier or driver 353 which applies the output signals to output line 354.

The clear outputs of stages 1 through 11 of shift register 335 are connected to AND gate 336. The output of AND gate 336 is therefore maintained negative or at ground potential so long as one or more of the clear outputs of stages 1 through 11 is negative. When stages 1 through 11 are all in the clear condition, however, that is, when mark signals are stored throughout, all of the inputs to gate 336 are rendered positive, providing a positive condition at the output thereof. Consequently, inverter 337 applies a ground condition to lead 338 when shift register 335 contains no spacing signals. Conversely, inverter 337 renders lead 338 positive when one or more spacing signals are in shift register 335, as indicated by the set condition of one of stages 1 through 11.

The signaling speed of the sender is determined by one of clocks 345, 346 or 347. This is determined by the operation of key top 103, FIG. 1, to the appropriate signaling speed thereby closing key contacts 348, 349 or 350. This connects clock 345, 346, or 347, respectively, to the toggle input of flip-flop 341. Accordingly, flip-flop 341 is cycled at one-half the clock rate of the clock connected thereto since the condition of the flip-flop is changed in response to each input cycle.

The output set lead of flip-flop 341 is connected to the A-C input of gate 342. The other input of gate 342 is connected to lead 338. Accordingly, when lead 338 is positive, as previously described, gate 342 is enabled and the positive transition from the output set lead of flip-flop 341 is passed therethrough to lead 352. This provides the shift pulses for shift register 335 and thus determines the transmission speed.

In the initial idle condition, with all of shift register stages 335 in the cleared condition, the output of gate 336 is positive and inverter 337 applies ground to lead 338. This ground potential is passed through diode 356 to the clear output of shift register stage ST whereby the stage is set, since the positive potential, if any, at the clear output is removed. Thus a spacing start signal is stored in stage ST. The ground on lead 338 is also applied by way of diode 357 to the output set terminal of flip-flop OUT. This drives stage OUT to the clear condition, storing a marking signal therein, which marking signal is applied to driver 353 and thence to output lead 354 maintaining the output in the idle marking condition.

The ground on lead 338 also passes by way of lead 339 to inverter 343. Inverter 343 thus applies current through coils 304 to 306. Accordingly, coils 304 through 306 produce magnetic flux to oppose the flux provided by magnet 306 in each of the keys. Thus, in the idle condition, the keys are unlocked, as previously described.

In the initial idle condition, ground is applied through normally closed repeat key contacts 318 to resistor 317 which is coupled to the right-hand plate of capacitor 315, as viewed in FIG. 3. Since the negative side of 4-layer diode 316 is connected to the junction of capacitor 315 and resistor 317 and the positive side is connected to a positive voltage supply, the diode breaks down conducting current therethrough and rendering the potential at the junction of resistor 317 and capacitor 315 positive.

Assuming now the operator desires to send ASCII characters, the code key 104. FIG. 1, is operated to the ASCII position, whereby contacts 321 and 331 are closed. In addition, to send at the appropriate speed, baud key 103 is rotated to the 110-speed position, whereby contacts 348 are closed.

Assuming now the operator desires to transmit the ASCII character A and depresses the appropriate A key, contacts 301 close and positive battery is passed to lead 310, as previously described. Lead 310, as previously described, interleaves cores 2A through 6A and 8A and then extends to terminal 311. Since terminal 311 is connected to lead 314 by way of resistor 312 and lead 314 is connected to lead 338, lead 314 is at a ground potential with the circuit idle and consequently terminal 311 is at ground. Accordingly, the application of the positive battery to lead 310 raises the potential at terminal 311 and the current from lead 310 drives upward the selected ones of the cores, as previously described. In addition, the positive-going transition at terminal 311 is passed through capacitor 315, raising the voltage on diode 316 and therefore decreasing the current below the threshold holding current. Accordingly, diode 316 stops conducting.

After a short interval of time, sufficient to permit the chattering, if any, of contacts 301 to subside, capacitor 315 discharges sufficiently through resistor 317 and repeat key break contacts 318 to permit diode 316 to again break down and conduct. This current surge through diode 316 rapidly raises the potential on capacitor 315, whereby a positive pulse is passed through the capacitor and thence by way of terminal 311 through lead 310 since contacts 301 are closed. This pulse is through a low impedance path providing a large current surge whereby the cores previously driven downward are now driven to saturation in the upward direction.

Driving cores 2A through 6A and 8A upward inserts the ASCII character in shift register 335 by setting stages 2 through 6 and 8 since ASCII key contacts 321 are closed. In addition, driving core ST upward sets stage #11 of shift register 335 by applying a positive pulse through contacts 331. With one or more of the shift register stages, including stage #11, "set," or in the spacing condition, the output of gate 336 goes to ground and inverter 337 brings lead 338 up to a postive potential. With lead 338 positive, this potential is applied to inverter 343. Accordingly, the output of inverter 343 drops to ground potential, removing the current through coils 304 through 306. As previously described, this removes the flux path opposing the flux set up by the magnets 206 connected to each of the keys. Thus, the unoperated ones of the keys are locked in the unoperated position.

Recalling now that baud key 103 is rotated to the 110-speed position closing contacts 348, the output of clock 345 is extended to the toggle input of flip-flop 341. Consequently, clock 345 alternately operates flip-flop 341 to the "set" and "clear" conditions and upon the operation of flip-flop 341 to the "set" condition, the postive transition at the output set lead is applied to gate 342. When inverter 337 renders lead 338 positive, as described above, gate 342 is enabled and each positive transition applied thereto by flip-flop 341 is passed to lead 352, and thence to shift register 335 as shift pulses. Thus shift pulses are produced at one-half the cycle rate of clock 345.

The application of the first shift pulse to shift register 335 shifts the condition of each of the stages to the next subsequent prior stage. The shifting of the space condition in stage ST to stage OUT thus removes the idle marking condition on lead 354 and driver 353 now applies the spacing or start element thereto. Concurrently therewith, the spacing bit in stage 11 is shifted to stage 10, the first information bit is shifter to stage ST and the remaining 7 information bits are advanced one stage.

When the next shift pulse is applied to shift register 335, the first information bit is passed from stage ST to stage OUT and accordingly the spacing start element is removed from output lead 354 and the first information element is substituted therefor. Concurrently therewith, all information bits are advanced one stage and the spacing bit intially inserted in stage 11 is now entered in stage 9.

For the next 7 shift pulses, the next 7 information bits are sequentially shifted into stage OUT and the spacing bit initially inserted in stage 11 is advanced through stages 3 through 8 and inserted in stage 2. At this point, all the information bits have been applied to output lead 354.

On the next, or 10th shift pulse, the condition initially stored in stage 9, which was marking, is shifted through to stage OUT. This returns output lead 354 to the marking condition and simulates the first marking stop element. The spacing bit initially in stage 11 is now shifted to stage 1 in shift register 335. Upon the application of the next shift pulse, the spacing bit is passed to stage ST of shift register 335 and stage OUT accepts the condition initially stored by stage 10, which condition was marking, thereby applying the second stop element to output lead 354.

Since the spacing bit initially inserted in stage 11 has been shifted to stage ST, stages 1 through 11 are now in the marking or clear condition. Accordingly, the output of gate 336 is restored to the initial positive condition and inverter 337 brings lead 338 down to ground. Ground is therefore restored to lead 314 and to lead 339. With ground on lead 339, inverter 343 reapplies current to coils 304 through 306, enabling the keyboard keys. In addition, with ground on lead 338, gate 342 is disabled, terminating the application of shift pulses to shift register 335. The ground on lead 338 also assures that stage OUT of shift register 335 is placed in the clear condition and stage ST is placed in the set condition, as previously described. Accordingly, the circuit is now prepared to accept the next character. It is noted here that the next character will not be shifted out until flip-flop 341 is again set thereby insuring that two full stop elements will be applied to output lead 354 before the first shift pulse enables shift register 335 to pass the start element of the next character to output lead 354. It is further noted that, since the keys are latched until the character is transmitted, the operator may determine the instant that the character transmission is completed. This permits the operator to adjust the typing speed to conform with the actual transmission speed.

When the operator desires to transmit Baudot characters, code key 104 is operated to the Baudot position whereby contacts 320, 330 and 340 are closed. In addition, to send at the appropriate speed, baud key 103 is rotated to the 100-speed or 60-speed position whereby contacts 349 or 350 are closed. Clock 346 or 347 thus controls the transmission speed since the appropriate clock output is extended to flip-flop 341.

When the operator depresses the desired character key such as the A key, the appropriate cores are driven upward to saturation, as previously described. Since Baudot key contacts 320 extend ground to cores 1B through 5B, the Baudot code character elements are inserted in stages 1 through 5 of shift register 335. In addition core ST inserts a spacing bit in stage 8 by way of key contacts 330 or diode 332.

With one or more of the shift register stages, including stage 8, set or in the spacing condition, the output of gate 336 goes to ground and inverter 337 brings lead 338 up to a positive potential. This removes the current from coils 304 through 306, removes ground from lead 314, and applies an enabling potential to gate 342, as previously described.

With gate 342 enabled, the first shift pulse provided to shift register 335 by way of lead 352 shifts the start element in stage ST to stage OUT, shifts the spacing bit in stage 8 to stage 7, and advances one stage the information bits stored in shift register 335 in the same manner as previously described for the ASCII code character. Accordingly, output lead 354 goes to the spacing start condition.

The second through sixth shift pulses advance each of the information elements to stage OUT thereby serially applying these elements to output lead 354. In addition, the spacing bit initially inserted in stage 8 is shifted to stage 2. When the 7th shift pulse is applied to shift register 335, stage OUT goes back to the marking condition, applying the marking stop element to lead 354. In addition, the spacing bit initially inserted in stage 8 is now shifted to stage 1. The application of the 8th shift pulse to shift register 335 moves the spacing bit to stage ST. At this time, lead 354 has been in the marking condition for the duration of one complete stop element. Concurrently, with stages 1 through 11 now in the clear condition, the zero outputs thereof are all positive, driving the output of gate 336 to the positive condition. This reapplies ground to lead 338, whereby the circuit is prepared to accept the next character, as previously described.

The positive transition at the output of gate 336 is also passed by way of contacts 340 to the clear input of flip-flop 341. In consequence thereof, flip-flop 341 is restored to the clear condition. Thus the next cycle of the clock output restores flip-flop 341 to the set condition. Since this next cycle occurs one-half element later, flip-flop 341, upon being again set, provides a shift pulse to gate 342 one-half of an element interval after the 8th shift pulse of the prior character. Accordingly, assuming that a new character is inserted in shift register 335 and gate 342 is again enabled, the shift pulse providing the start element occurs one-half element after the 8th shift pulse of the prior character whereby a stop signal having a duration of one and one-half elements is provided.

As previously described, the circuit is restored to its initial condition and prepared to accept the next character during the latter portion of the stop element. In the event, however, that the operator overcomes the restraint of a key to depress it prior to the restoration of the circuit, the circuit is arranged to preclude the insertion of the character in shift register 335.

Assume now that during the character transmission the operator releases the depressed one of the keys 101 thereby opening one of contacts 301 through 303. This removes the previously-described positive battery provided to terminal 311 through these contacts now opened. Since gate 336, during the character transmission, provides ground to inverter 337 which, in turn, applies a positive potential to lead 314, no current is passed through terminal 311 during the character transmission. Accordingly, upon the opening of one of contacts 301 through 303, there is no current change since the opening of these contacts opens the path through the cores to maintain a "no current" condition.

Upon the closure of the new contacts 301 through 303, positive battery is again provided through resistor 308 and the closed one of the contacts. Since a positive charge is maintained on capacitor 315 by lead 314, the "no current" condition through leads interleaving the cores is maintained. In addition, the closure of the contact and the maintaining of the current condition precludes the application of a pulse through capacitor 315 to diode 316. Accordingly, the conductive condition of diode 316 is maintained and the driver circuit is not prepared to return a pulse through capacitor 315 and the core winding.

At the termination of the transmisson of the character, the output of gate 336 returns to a positive condition whereby inverter 347 restores ground on lead 314. The charge on capacitor 315 is not changed, however, since the operated one of contacts 301 through 303 maintains it positive. Thus, the application of the pulse through capacitor 315 and the enabling of diode 316 in the magnetic core driver circuit is precluded. Current, however, now passes through the operated one of contacts 301 through 303 and through terminal 311 to lead 314 by way of resistor 312. This current, however, is severely limited by resistor 312 to preclude the saturation of the cores. When the operated one of contacts 301 through 303 is then opened by the operator, releasing the key, the cores restore upward to the neutral condition, but since the current was initially small, the restoration is minimized and the consequent core output pulses are ineffective to insert a character in the shift register. Accordingly, the insertion and subsequent transmission of the character is precluded and the operator must again operate the character key to transmit the character.

During key sender operation, the operator may maintain depressed a character key for an interval longer than the transmission interval of the character. In this event, with the key yet depressed, the character transmission will terminate and ground will again be restored on lead 314. The circuit, however, is arranged to preclude the repeated transmission of the character.

With the restoration of ground on lead 314, as described above, and the operated one of contacts 301 through 303 maintained closed, the positive charge on capacitor 315 is maintained by the closed contact in the same manner as described above with respect to the preclusion of transmitting a new character when the operator depressed a key prematurely. In addition, in a similar manner, current through the cores is limited by resistor 312 to preclude core saturation. Accordingly, when the operator subsequently releases the key and the contacts open, the restoration is minimized and the output pulse is effective to reinsert the character in shift register 335.

In the event that the operator desires to transmit the character repeatedly, repeat key 105 is depressed to operate repeat key contacts 318. This disconnects resistor 317 from ground and extends lead 314 by way of the make contacts of repeat key contact 318 to resistor 317. Accordingly, during the transmission of the character with lead 314 rendered positive, this positive potential is passed through resistor 317 to diode 316 and diode 316 stops conducting. When the transmission of the character is terminated, ground on lead 314 is restored, permitting the restoration of conduction through diode 316. With the operated one of contacts 301 through 303 maintained operated, a positive pulse is then passed through capacitor 315 and the core windings. This, as previously described, drives the cores upward to saturation and thus reinserts the character on shift register 335.

With the character reinserted in shift register 335, the character transmission is repeated, positive condition is reapplied to lead 314, and the conductive condition of diode 316 is again terminated. Accordingly, the cycle is repeated, the character is again inserted in shift register 335 and the transmission is thus repeated. This cycling and repeated transmission will persist until the operated key 101 is released or repeat key 105 is released to restore the circuit to the normal condition.

What is claimed is:

1. In combination with a mechanical key, a pair of magnetic reed contacts, a magnetic latch for inhibiting movement of said key, a permanent magnet attached to said key and arranged to be transported to a position adjacent said latch when said key is operated to a first position and to a position adjacent said contacts when said key is operated to a second position, and a source of magnetic flux coupled to said magnetic latch.

2. The combination with a mechanical key in accordance with claim 1 wherein said magnetic latch comprises a pair of conductive members spaced to encompass said permanent magnet when said key is operated to said first position.

3. The combination with a mechanical key in accordance with claim 2 wherein at least a portion of said reed contacts are positioned outside said spacing between said conductive members.

4. The combination with a mechanical key in accordance with claim 2 wherein said magnetic flux source comprises a magnetic core mounted in said spacing between said conductive members together with a coil wound on said core and adapted to conduct current therethrough.

5. The combination with a mechanical key in accordance with claim 4 wherein said key includes spring means for urging said key to said first position.

6. In combination with a mechanical key, magnetic key holding means for inhibiting movement of said key, a pair of contacts arranged to be operated by the applicationof magnetic flux, a first source of magnetic flux for passing said flux through said holding means, said first source attached to said key to pass said flux through said contacts upon the operation of said key, and a second source of magnetic flux for opposing said flux passed through said holding means.

7. In combination with a mechanical key arranged to be operated to a first and second position, a pair of contacts operable in response to the application of magnetic flux thereto, magnetic key holding means for inhibiting movement of said key, a first source of magnetic flux transportable by said key for passing flux through said holding means when said key is operated to said first position whereby movement of said key is restrained and for passing flux through said contacts when said key is operated to said second position whereby said contacts are operated, and a second source of magnetic flux for opposing said flux passed through said holding means.

8. The combination with a mechanical key in accordance with claim 7 wherein said first source of magnetic flux comprises a permanent magnet attached to said key.

9. The combination with a mechanical key in accordance with claim 7 wherein said key holding means comprises a pair of conductive members spaced to encompass said first source of flux when said key is operated to said first position.

10. The combination with a mechanical key in accordance with claim 9 wherein said second source of magnetic flux includes a magnetic core mounted in said spacing between said conductive members together with a coil wound on said core and adapted to conduct current therethrough.

11. The combination with a mechanical key in accordance with claim 9 wherein said pair of contacts comprise magnetic needs having at least a portion thereof positioned outside said spacing between said conductive members.

12. In combination with a mechanical key arranged to be operated to a first and second position, a pair of contacts operable in response to the application of magnetic flux thereto, magnetic key holding means for inhibiting movement of said key, a first source of flux connected to said key and adaptable to close a first flux path including said key holding means when said key is operated to said first position and to close a second flux path including said contacts when said key is operated to said second position, and a second source of flux coupled to said first flux path for opposing said first source.

13. The combination with a mechanical key in accordance with claim 12 wherein said second source of magnetic flux includes a normally energized coil and means responsive to closure of said contacts for de-energizing said coil.

14. In a keyboard, a plurality of mechanical keys, each of said keys arranged to be operated to a first and second position, a pair of contacts operable in response to the application of magnetic flux thereto, magnetic key holding means for inhibiting movement of said keys, a first source of magnetic flux transportable by said key for passing flux through said holding means when said key is operated to said first position whereby movement of said key is restrained and for passing flux through said contacts when said key is operated to said second position whereby said contacts are operated, and a second source of magnetic flux for opposing said flux passed through said holding means.

15. In a keyboard in accordance with claim 14 wherein said second source of magnetic flux includes a normally energized coil individual to each key and means responsive to closure of any one of said pairs of contacts for de-energizing said coils.

16. In a keyboard sender, a plurality of mechanical keys, each of said keys arranged to be operated to a first and second position, key holding means, a source of magnetic flux for passing flux through said holding means when said key is operated to said first position whereby movement of said key is restrained, a pair of contacts individual to each of said keys and operable in response to the operation of said key to said second position, signal sending means responsive to the operation of said contacts for sending data signals, and means responsive to said signal sending means for enabling said source of magnetic flux when said key is operated to said first position.

17. In a keyboard sender in accordance with claim 16 wherein said source of magnetic flux is transportable by said key to pass flux through said contacts when said key is operated to said second position and said contacts are operable in response to the application of magnetic flux thereto.

18. In a keyboard, a plurality of mechanical keys, each of said keys arranged to be operated to a first and second position, key holding means, a first source of magnetic flux connected to each of said keys for passing flux through said holding means to restrain movement of said key, a second source of magnetic flux for opposing said flux passed through said holding means, a pair of contacts operable in response to the operation of said key to said second position, and means responsive to said operation of said contacts for disabling said second source of magnetic flux.

19. In a keyboard in accordance with claim 18 wherein said first source of magnetic flux comprises a permanent magnet transportable by said key to a position adjacent to said holding means when said key is operated to said first position.

20. In a keyboard in accordance with claim 18 wherein said first source of magnetic flux is transportable by said key to a position adjacent to said pair of contacts when said key is operated to said second position and said pair of contacts comprise reed contacts operable in response to the application of flux thereto.

21. In a keyboard in accordance with claim 18 wherein said second source of magnetic flux includes a coil winding adapted to conduct current therethrough and a normally enabled source of current connected thereto.

22. In a keyboard in accordance with claim 21 wherein said means for disabling said second magnetic flux source includes register means, coding means responsive to the operation of each of said contacts for inserting signal bits in said register, an output circuit for transmitting said registered bits, means for detecting said bits in said register, and means responsive to said detecting means for disabling said current source.

23. In a keyboard, a plurality of mechanical keys, each of said keys arranged to be operated to a first and second position, means enabled when said key is operated to said first position for restraining movement of said key, normally operable means for overcoming said restraining means, a pair of contacts individual to each key and operable in response to the operation of said key to said second position, and means responsive to said operation of any of said pairs of contacts for disabling all of said normally operable means.

24. In a keyboard in accordance with claim 23 wherein said restraining means includes a source of magnetic flux connected to said key and a conductive member arranged to be positioned adjacent to said source of flux when said key is operated to said first position.

25. In a keyboard in accordance with claim 24 wherein said pair of contacts comprise magnetic reed contacts operable in response to the application of magnetic flux and arranged to be positioned adjacent to said source of flux when said key is operated to said second position.

26. In a code signal sender, a register comprising a plurality of locations, a signal source for applying code signal bits to said register locations, an output circuit for obtaining said bits in said register and transmitting said bits, means for examining said locations of said register for the presence of any bits, and means responsive to said examining means for disabling said signal source.

27. In a code signal sender in accordance with claim 26 wherein said register comprises a shift register.

28. In a code signal sender in accordance with claim 26 wherein further means responsive to said signal source applies an additional bit to said register.

29. In a code signal sender in accordance with claim 26 wherein said signal source includes a keyboard having a plurality of mechanically operable keys, a contact pair individual to each key and operable in response to the operation of each key, means responsive to the operation of each key for selectively applying said bits to said register, and a source of magnetic flux for restraining movement of said key, said source of flux being enabled by said signal source diasbling means.

30. In a code signal sender in accordance with claim 26 wherein said signal source includes a plurality of magnetic cores for applying said bits to said register, a plurality of contact pairs, each of said pairs for enabling selected ones of said cores, a core driver circuit responsive to the operation of said contact pairs for operating said enabled cores, said core driver circuit being disabled by said signal source disabling means.

31. In a signal sender, a register for storing signal elements, an output circuit for obtaining said elements stored in said register and transmitting said obtained elements, a plurality of magnetic cores for applying signal elements to said register, a source of potential, a plurality of leads for selecting predetermined ones of said cores, means for applying said potential source to a selected lead, a core driver circuit coupled to said leads and responsive to the application of said potential source to said lead for operating said selected cores, and biasing means responsive to said output circuit for blocking the application of said potential source to said driver circuit.

32. In a signal sender in accordance with claim 31 wherein said output circuit includes means for detecting the presence of any signal elements in said register to block said application of said potential source to said driver circuit.

33. In a signal sender in accordance with claim 31 wherein said core driver includes a pulser circuit for energizing said selected lead and a timer circuit responsive to the application of said potential source to said selected lead for operating said pulser circuit at the termination of a delay interval.

34. In a signal sender in accordance with claim 33 wherein said biasing means blocks the application of said potential source to said timer circuit.

35. In a signal sender in accordance with claim 35 wherein each of said leads is interwoven through said cores so that the energization of said selected lead by said pulser circuit saturates said predetermined ones of said cores.

36. In a signal sender in accordance with claim 35 wherein each of said cores includes an output winding for applying a signal element to said register in response to said saturating of said core.

References Cited

UNITED STATES PATENTS

| | | | |
|---|---|---|---|
| 2,997,703 | 8/1961 | Powell | 340—365 |
| 3,042,900 | 7/1962 | Werts | 340—168 |
| 3,296,369 | 1/1967 | Clark et al. | 340—365 |

FOREIGN PATENTS

| | | |
|---|---|---|
| 6,407,638 | 1/1965 | Netherlands. |

THOMAS A. ROBINSON, Primary Examiner

U.S. Cl. X.R.

178—17.5; 197—98; 335—153; 340—147, 365